May 7, 1957 P. BAKKER 2,791,635

P.A.B.X SELECTOR-CONNECTOR SWITCH

Filed Feb. 20, 1952 2 Sheets-Sheet 1

INVENTOR.
PIER BAKKER

BY [signature]

ATTY.

May 7, 1957 P. BAKKER 2,791,635

P.A.B.X SELECTOR-CONNECTOR SWITCH

Filed Feb. 20, 1952 2 Sheets-Sheet 2

INVENTOR.
PIER BAKKER
BY Chas. W. Candy
ATTY.

United States Patent Office 2,791,635

Patented May 7, 1957

2,791,635

P. A. B. X SELECTOR-CONNECTOR SWITCH

Pier Bakker, Chicago, Ill., assignor to General Telephone Laboratories, Incorporated, a corporation of Delaware Application February 20, 1952, Serial No. 272,647

19 Claims. (Cl. 179—18)

Figure 1:
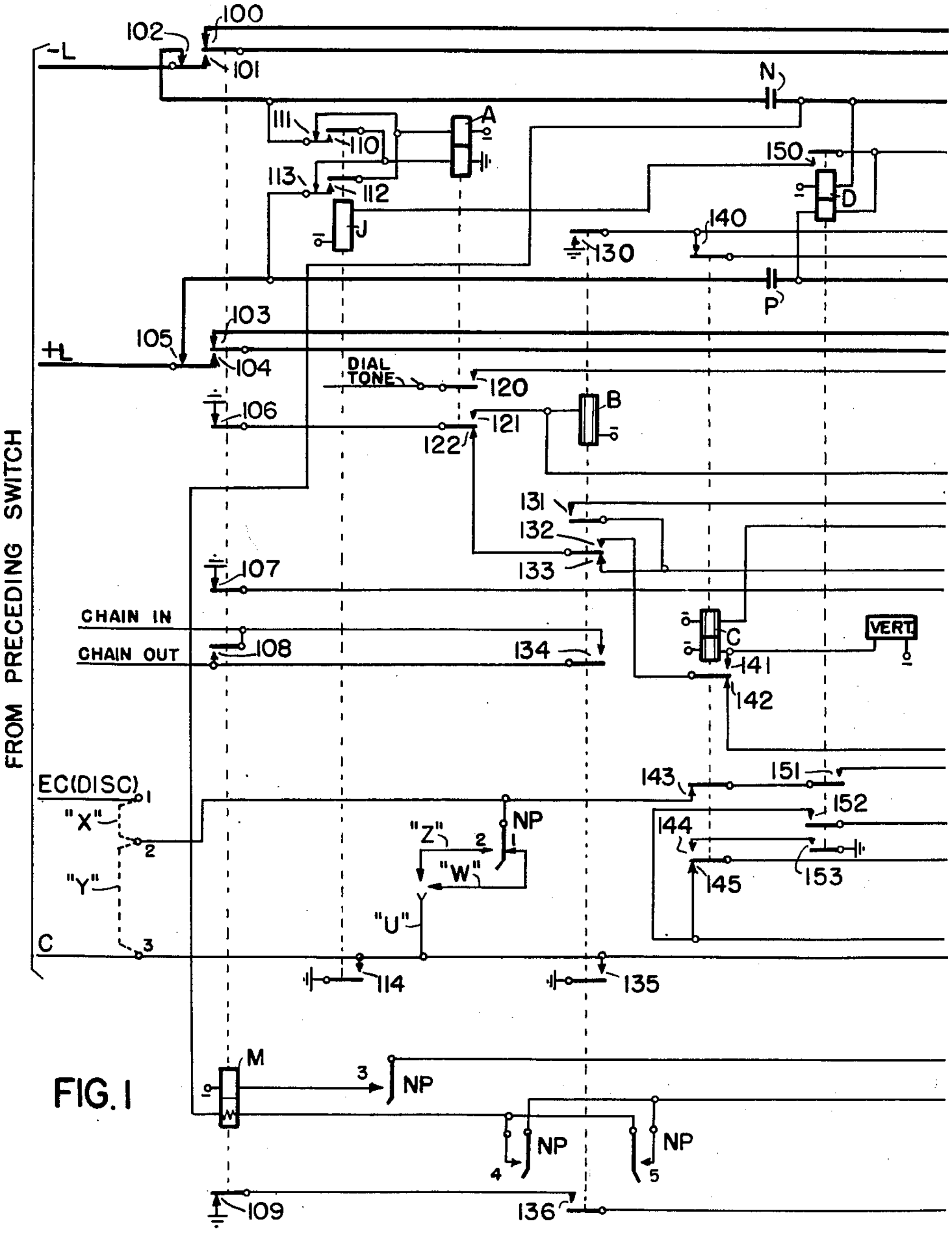

The present invention relates in general to automatic telephone systems and its object, broadly stated, is to provide new and improved circuit arrangements for automatic connector switches having access to trunk lines, private branch exchange subscriber lines, and regular subscriber lines.

In the present invention each private branch exchange subscriber line and each regular subscriber line is assigned an individual three-digit call number, while the group of private branch exchange subscriber lines is assigned a single-digit common group call number and the group of trunk lines is assigned a single-digit common trunk call number. The regular subscriber lines comprise two main groups each of which is divided into sub-groups corresponding to the different switch levels. The connector switch is provided with two wiper sets, the first wiper set having access to the trunk group, the private branch exchange subscriber group, and the first regular subscriber group, while the second wiper set has access only to the second regular subscriber group. Normal post springs are provided in the connector switch and are operated whenever the switch wipers are elevated to the level terminating the trunk group or the private branch exchange group.

One of the features of the present invention relates to the means whereby the first digit of a three-digit call number operates the wiper sets in an initial primary movement after which the wiper sets are automatically restored to cause one of said wiper sets to be selected for use dependent on the first digit of the three-digit number; the second digit of the three-digit number reoperates the switch in a second primary movement to select the level containing the desired sub-group of regular subscriber lines or the group of private branch exchange subscriber lines; the third digit then operates the switch in a directive secondary movement to select a particular one of the lines in this selected level. The normal post springs are only effective to cause an automatic secondary movement of the switch to automatically select the first idle private branch exchange line, or the first idle trunk line in their respective levels in case the first dialed digit corresponds to the single-digit trunk call number; while the operation of the normal post springs on the second primary movement is ineffective to cause an automatic secondary movement.

Another feature, dependent upon the preceding feature, is the providing of means whereby in making a single-digit trunk call, the normal post springs are effective to cause the connector to switch through a direct metallic circuit over the talking conductors thus cutting off all bridges such as the battery feed and ringing bridges from the talking conductors, while if such normal post springs are operated on the second primary movement of the switch, the circuit means for causing this switch-through operation was previously opened as a result of the automatic release of the switch from its initial primary setting.

Another dependent feature controlled by the normal post springs is the means by which only a certain class of subscribers is permitted to establish connections to the trunk groups.

A further feature relates to the means whereby the connector switch is capable of establishing a connection to the first idle private branch exchange line in response to a single-digit group call number assigned to the private branch group or for establishing a connection to a particular desired one of said private branch exchange lines in response to a three-digit call number individually assigned to this particular level.

Still another feature relates to means whereby dialing two given digits, a predetermined bank contact in the first group is engaged by one set of wipers, and by dialing the same two given digits preceded by a predetermined digit, the same predetermined bank contact is engaged by one set of wipers; while dialing the same two digits preceded by a different predetermined digit, a corresponding bank contact in the same level but in the second group is engaged by the second set of wipers.

Further features of the invention pertain to the particular arrangement of the circuit elements of the system, whereby the above-outlined and additional operating features are attained.

Figure 2:
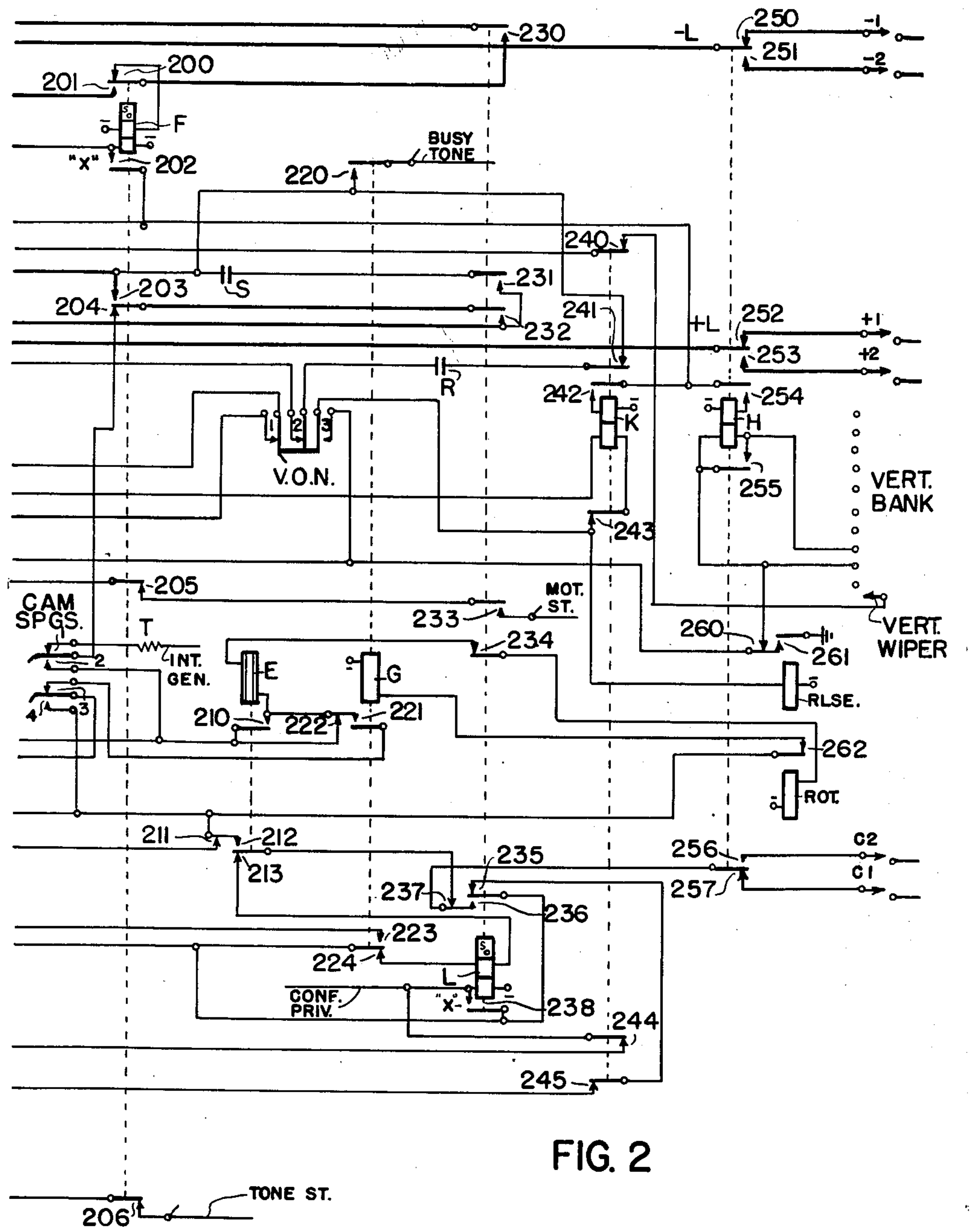

The invention, both as to its organization and method of operation, together with further objects and advantages thereof, will best be understood by reference to the following specification taken in conjunction with the accompanying drawing comprising Figure 1 and Figure 2. The drawing illustrates the arrangement of telephone circuits incorporated in a drop-back connector embodying the present invention.

OPERATION ON REGULAR SERVICE LEVELS

*Station to station service—seizure*

When the connector switch is seized by the line over which a call is originated, line relay A will be energized by a current flowing from ground, through the lower winding of relay A, through the break contacts 113 on relay J, through the break contacts 105 on relay M, over the line +L, through the pulse springs of the dialing telephone (not shown), back over the line —L, through the break contacts 102 on relay M through the break contacts 111 on relay J, and through the upper winding of relay A to —battery.

When relay A is energized it performs the following functions: release relay B become operated by current flowing from —battery through the winding on the B relay, through the make contacts 121 on relay A, and through the break contacts 106 on relay M to ground; relay C becomes operated by current flowing from —battery through the upper winding on relay C, through the V. O. N. springs 1, through the make contacts 121 on relay A, and through the break contacts 106 on relay M; Dial Tone is impressed on the dialing line by passing through the make contacts 120 on relay A, through the V. O. N. springs 2, through the condenser R, through the break contacts 241 on relay K, through the condenser P, and through the break contacts 105 on relay M to the + line.

Operation of B relay causes: the grounding of Tone ST. by make contacts 136, thus starting the dial tone equipment; the grounding of the control lead C by make contact 135, thus protecting the connector from seizure by other calls during the time it is held by the calling person and holding the preceding switches in the train operated and protected; the closing of a part of the incomplete chain circuit, Chain In—Chain Out, by the make contacts 134; the partial preparation of the impulsing circuit to relay C and the vertical magnet Vert. by closing of the make contacts 132; and grounding of the incomplete lock circuits to relays F and K by the make contacts 130.

Relay C operates and prepares the pulsing circuit to the vertical magnet Vert. through the make contacts 141.

*Selecting the hundred group—Vertical movement of the shaft on first digit*

When the dial is operated, the current flowing through the telephone loop and relay A is interrupted and then closed, once for each pulse. The first pulse will permit relay A to release and establish a circuit from ground through the break contacts 106 on relay M, through the break contacts 122 on relay A, through the make contacts 132 on relay B, through the make contacts 141 on relay C, and both through the lower winding of relay C to —battery and through the winding of the vertical magnet Vert. to —battery. The vertical magnet operates and elevates the switch shaft one step. Because of its electromagnetic characteristics, relay B has slow release action and therefore remains operated during the series of pulses. It will be observed that during the remaining impulses of the digit series, the current flowing through the lower winding of relay C is supplied through its make contact 141, but being of the slow release type, relay C remains operated during the intermissions occurring during the series of impulses.

The off-normal springs operate on the first step of the shaft. The V. O. N. springs 1 open the circuit to the upper winding of relay C and V. O. N. springs 2 open, thus removing Dial Tone from the dialing line, while V. O. N. springs 3 prepare a circuit to the release magnet RLSE.

Upon completion of a series of impulses, relay C restores and transfers the impulsing circuit from the vertical magnet when contacts 141 open, to the rotary magnet through the contacts 142 via break contacts 222, relay E and break contacts 234; and if the first digit dialed was "2" or "3," prepares the circuit for selection of either the first—or second—hundred group of lines.

*Selecting the hundred line group (for use with three-digit line selection)*

Dialing "2" as the first digit selects the first-hundred line group. Current flows from ground through the make contacts 130 on relay B, through break contacts 140 on relay C, through the break contacts 240 on relay K, over the Vert. Wiper onto the second level on Vert. Bank, through the break contacts 260 on the RLSE magnet, through the V. O. N. springs 3, and through the winding on the RLSE magnet to —battery. The RLSE magnet then locks over the following circuit: ground through make contacts 261 on the RLSE magnet, through V. O. N. springs 3, and through the winding on RLSE magnet to —battery. Thereafter the RLSE magnet returns the shaft and wipers to normal position.

When the V. O. N. springs 3 open as the shaft drops to normal, relay K operates in series with the RLSE magnet over the following path: —battery, through the winding on RLSE magnet, through the break contacts 243 on relay K, through the lower winding on relay K, through the make contact 131 on relay B, and through the make contact 261 on RLSE magnet to ground. Immediately, relay K effects a lock circuit, the current flowing from —battery through upper winding on relay K through the make contacts 242, and through the make contacts 130 on relay B to ground. As a result of operation of K, the circuit to relays M and D is opened at one point when contacts 245 break open. It is seen that the upper winding on relay D is connected in series with the lower (resistance) winding on relay M. Opening of the circuit at one point to relays M and D prevents switching through on the trunk hunting level thus making available for use all of the connector terminals. Contacts 241 on relay K opens the circuit at one point and remove Dial Tone from the dialing line. Contacts 240 open another circuit at one point and remove ground from the Vert. Wiper to eliminate it during subsequently dialed digits. So if another digit "2" is dialed, the shaft will step up to the second level and will remain there, the RLSE magnet remaining inoperative because of lack of ground on the wiper. The RLSE magnet is de-energized when the resistance of the lower winding on relay K is placed in series with it, the other parallel circuit to the magnet having been opened when V. O. N. springs 3 opened upon return of the switch to normal.

Dialing "3" as the first digit selects the second hundred line group. Relay H, second hundred group selector relay, is actuated over the following path: ground through the make contacts 130 on relay B, through the break contacts 140 on relay C, through the break contacts 240 on relay K, over the Vert. Wiper onto the third level on Vert. Bank, through the lower winding of relay H, through the break contacts 260 on RLSE magnet, through the V. O. N. springs 3, and through the winding on RLSE magnet to —battery. It is to be noted here that although the windings on relay H and on RLSE magnet are connected in series, the current flowing in the circuit is of sufficient magnitude to operate only the H relay. Lock circuit for relay H is from —battery through the upper winding of relay H, through the make contacts 254, and through the make contacts 130 on relay B to ground. Make contacts 251, 253 and 256 on relay H transfer the lines —L, +L, and C from the first — to the second — hundred group wipers. Make contacts 255 short out the lower winding on relay H causing full voltage to be impressed across the winding on the RLSE magnet causing it to operate. The RLSE magnet then effects a lock circuit as previously described. The shaft and wipers are then returned to normal; relay K operates and locks; and the release magnet is deenergized as explained above when "2" was dialed.

*Vertical movement of shaft on second digit*

After the group selection has been accomplished by dialing either "2" or "3," dialing of the second digit will cause the switch to move vertically in the manner defined at the beginning of this operational description. Should digit "2" or "3" be dialed again, switch will step up to the dialed level but RLSE magnet will not operate to return the switch to normal because the ground on the wiper obtained at the make contacts 130 on relay B through the break contacts 240 on relay K was removed when relay K operated and opened the break contacts 240. Line relay A will again follow the pulses from the dial and operation is identical to that of the first digit.

*Rotary movement of the shaft on second or third digit*

Dialing of the third digit causes relay A to follow the pulses from the dial and to close a series circuit to relay E and the rotary magnet ROT, over the following circuit: ground through break contacts 106 on relay M, through the break contacts 122 on relay A, through the make contacts 132 on relay B, through the break contacts 142 on relay C, through break contacts 222 on relay G, through the winding on relay E, through the break contacts 234 on relay L, and through the winding on rotary magnet ROT to —battery. Upon operation of relay E, the upper winding of relay L is disconnected from the C wiper at the break contacts 213 on relay E so that relay L will not operate when the C wiper passes over any free lines; at the same time, the C wiper is connected through the make contacts 212 and through the break contacts 262 to the winding of relay G. Also the make contacts 210 close so as to short out the break contacts 222 on relay G so that the impulsing circuit will not be opened should relay G operate when the wipers pass over busy lines.

The series of pulses of the dialed third digit will cause the rotary magnet to actuate and rotate the shaft causing the wipers mounted thereon to be also rotated, step-by-step, across the horizontal level of bank contacts to the contacts of the dialed line.

*Testing the dialed line*

When the dialed line is busy, the circuit to relay G is closed from ground on the C wiper through the contacts 256 or 257 on relay H, through the break contacts 237 on relay L, through the make contacts 212 of relay E, and through the break contacts 262. The operation of this switch when the dialed line is busy is explained in a subsequent section entitled Dialed Line Busy.

*Dialed line free*

If the dialed line is free, relay E, on restoring after the series of pulses to the rotary magnet has terminated, closes the circuit to the upper winding on relay L in series with the bridge cut-off relay in the dialed line-switch over the C wiper over the following path: through the bridge cut-off relay (not shown), through the C wiper, through the contacts 256 or 257 on relay H, through break contacts 237 on relay L, through the break contacts 213 on relay E, through the upper winding on relay L, through the break contact 224 on relay G, and through the make contacts 135 on relay B to ground. Relay L operates and establishes a lock circuit from —battery through the lower winding on relay L, through the make contacts 238, and through the make contacts 135 on relay B to ground. Thereupon the indirect ground on the C wiper through the contacts 256 or 257 on relay H, through the break contacts 237 on relay L, through the break contacts 213 on relay E, through the upper winding on relay L, through the break contacts 224 on relay G, and through the make contacts 135 on relay B is replaced by direct ground over the following path: ground through make contacts 135 on relay B, through the make contacts 236 on relay L, and through contacts 256 or 257 on relay H to the C wiper. This marks the dialed line busy. Make contacts 233 on relay L close to place ground on MOT. ST. lead to start the ring tone equipment. Make contacts 232 close to place interrupter generator Int. Gen. current on the dialed line over the following path: Int. Gen. through the resistor T, through the cam springs CAM SPGS1, through the break contacts 204 on relay F, through the make contacts 232 on relay L and through the break contacts 103 on relay M onto the outgoing dialed line +L. Make contacts 231 on relay L place the ring-back tone current through the condensers S and P onto the dialing line +L through the break contacts 105 on relay M.

*Ringing the dialed station*

The interrupted ground-connected generator current completes a circuit through the ringer and condenser at the dialed station, through the wipers, through the contacts 250 or 251 on relay H, through the break contacts 100 on relay M, through the make contacts 230 on relay L, through the break contacts 200 on relay F, and through the upper winding on relay F to —battery. The copper slug and sleeve on relay F prevent the generator current from causing relay F to operate. A part of the generator current completes a circuit, as previously described, to the ring-back tone condenser S to give the dialing party the ring-back tone.

*Dialed party answers*

When the handset at the dialed station is removed, the direct current circuit to the upper winding on relay F is closed through the loop at the dialed station. Relay F operates and effects a lock circuit from —battery through the lower winding on relay F, through the make contacts 202 and through the make contacts 130 on relay B to ground. Break contacts 206 and break contacts 205 remove grounds from the Tone ST. lead and from Motor ST. lead, thus stopping the busy tone and ringing tone equipment, respectively. Break contacts 204 remove at this point ths generator current from the dialing and dialed lines. Make contacts 201 close the circuit to the upper winding on relay D through the loop at the dialed station, causing it to operate. As a result of operation of relays F and D, relay J becomes energized over the following path: —battery through the winding of relay J, through the make contacts 150 on relay D, through the make contacts 202 on relay F, and through the make contacts 130 on relay B to ground. As a result of the operation of relay J, make contacts 110 and 112 close and reverse battery to the calling party in a well known manner.

Transmission current to the calling telephone is supplied through the two windings on relay A, while battery to the called telephone is fed through the two windings on relay D. These two circuits are separated by the condensers N and P, each connected to one side of the line.

*Releasing*

If, after the conversation has been completed, the handset at the dialing station is replaced, the circuit to relay A will be opened. Relay A restores and opens the circuit to relay B. When relay B restores, make contacts 130 open up the ground connection at this point to relays F, D, J and K, thus restoring them. Make contacts 135 open up and remove the ground connection in the lock circuit to the lower winding on relay L, thus restoring it. Make contacts 134 open a part of the chain circuit Chain In and Chain Out. Restoration of relay B also allows the current to flow from ground through the break contacts 106 on relay M, through the break contacts 122 on relay A, through the break contacts 133 on relay B, through the V. O. N. springs 3, and through the winding on RLSE magnet to —battery. The RLSE magnet operates and allows the shaft to return to normal, thus restoring the V. O. N. springs. The V. O. N. springs 3 open the circuit to the release magnet which then becomes deenergized. The battery to the release magnet is taken through a supervisory relay (not shown), so that an alarm will be given if the shaft fails to restore the V. O. N. springs.

*Dialed line busy*

If the dialed line is busy, relay G operates from the ground on the C wiper through the contacts 256 or 257 on relay H, through the break contacts 237 on relay L, through the make contacts 212 on relay E, through the break contacts 262 on rotary magnet ROT, and through the winding on relay G to —battery. Break contacts 224 open part of incomplete circuit to the upper winding on relay L so that relay L will not operate if the dialed line becomes free. Make contacts 220 place a busy tone on the dialing line by way of condenser P and the break contacts 105 on relay M. After the termination of the series of impulses to the rotary magnet, relay E restores and closes a lock circuit to relay G so that relay G will not restore and cause this connector switch to seize the dialed line should the dialed line become free. The lock circuit can be traced from —battery through the winding on relay G, through break contacts 262 on the rotary magnet, through the break contacts 211 on relay E, through the break contacts 145 on relay C, through the make contacts 223 on relay G, and through the make contacts 135 on relay B to ground.

If the called line is busy and the handset at the dialing station is replaced, relay A restores and allows B to restore. Relay B removes ground from the C lead when the make contacts 135 open up thus allowing the preceding switches to release and to make this switch free. Ground is also removed from relays K and H when the make contacts 130 open up. Relay G, which is operated over the following path: ground through the make contacts 135 on relay B, through the make contacts 223 on relay G, through the break contacts 145 on relay C, through the break contacts 211 on relay E, through the break contacts 262 on rotary magnet ROT, and through the winding on relay G to —battery, is restored when the make contacts 135 open up. Make contacts 134 on relay B open up partially the chain circuit Chain In and Chain Out. The release magnet is then energized from ground through break contacts 106 on relay M, through break contacts 122 on relay A, through the break contacts 133 on relay B, through the V. O. N. springs 3, and through the winding on release magnet to —battery. Release magnet operates and allows the shaft to return to normal thus restoring the V. O. N. springs. The V. O. N. springs 3 open the circuit to the released magnet.

*Code call service*

When the code call equipment is provided, the code call equipment is connected to the tenth bank contacts on some level (usually the seventh). To call someone over the code call system, the dialing party dials the code call number assigned to the desired party. The first two digits of the dialed number cause this switch to connect its wipers to the code call equipment and the last two digits are repeated by this switch to cause the code call equipment to operate the code call signals. To answer the call, the desired party dials a predetermined number from any telephone, causing the associated equipment to operate and complete the connection to the dialing party through the code call equipment. Since the number in the second-hundred group corresponding in physical position to the assigned code call number in the first-hundred group cannot be used for subscriber line assignment because the ringing source is removed therefrom by opening of CAM SPGS1, such number may be assigned as the answer number which the called party may use in establishing communication with the calling party. Such answer number would consist of 3 digits such as "370."

*Seizure*

When this switch is seized, it performs the functions as previously explained under the heading Station to Station Service—Seizure.

*Connecting the wipers to the code call equipment*

Two digits (usually 70) select the code call number. The first digit elevates the wipers to the seventh level and the second digit rotates the wipers to the tenth step. As a result, cam springs, CAM SPGS1 open up thus preventing the placing of generator current on the code call equipment; and the CAM SPGS2 make thus preparing a circuit for repeating impulses to the equipment ahead.

*Testing the code call equipment*

The code call equipment is tested as explained previously under Station to Station—Testing the Dialed Line.

*Code call equipment free*

Relays A and B operate in a well known manner. Relay L operates and closes its lock circuit. The indirect ground on the C wiper (which makes the code call equipment busy) is replaced by direct ground through the make contacts 135 on relay B, through the make contacts 236 on relay L, and through the contacts 256 or 257 onto the C wiper. The break contacts 234 on relay L open at this point the circuit connecting relay E to the rotary magnet thus precluding the impulses of the third dialed digit from operating the above-named components. Upon receipt of the last impulse of the dialed second digit, the switch engages and operates the cam springs. CAM SPGS1 open and prevent the application of ringing current from Int. Gen. to the code call equipment placed ahead. CAM SPGS2 close and thereby forward the impulses of any subsequent digit dialed after the expiration of impulses of the second digit. Relay L also establishes a partial circuit to relay F over the following path: —battery through the upper winding on relay F, through the break contacts 200 on relay F, through the make contacts 230 on relay L, through the break contacts 100 on relay M, and through the contacts 250 or 251 on relay H to the "—" wiper.

*Repeating impulses*

Impulses of subsequent digits after the first two digits cause the current to flow from ground through the break contacts 106 on relay M, through the break contacts 122 on relay A, through the make contacts 132 on relay B, through the break contacts 142 on relay C, through the CAM SPGS2, through the break contacts 204 on relay F, through the make contacts 232 on relay L, through the break contacts 103 on relay M, through the contacts 252 or 253 on relay H, onto the "+" wiper and over a line to the code call equipment (not shown) to "—" battery. Thereupon the electromagnets at the code call equipment close and cause the wipers located within the equipment to be operated to the dialed bank contacts. As a result, the code call equipment causes the code call bells to ring the dialed code signal.

*Desired party answers*

When the desired party dials the answer code call number, a connector is caused to connect its wipers to the answer code call bank contacts (the + and — answer and call bank contacts being multiplied but reversed). The answering connector closes the circuit to the upper winding on relay F over the "—" wiper of this switch. Relay F operates and closes the circuit to its lower winding; and connects relay D across the + and — wipers of this switch, causing the ring cut-off relay in the answering connector to operate and complete the circuit for transmission. Relay D operates in series with the back bridge relay of the answering connector. As a result of operation of relays D and F, relay J is energized and in turn reverses battery to the line as answering supervision if the calling party is the operator.

Transmission battery is furnished through relay A to the dialing line.

*Releasing*

When the handset at the dialing telephone is replaced, this switch releases as explained under Station to Station Service—Releasing. The cam springs restore as the shaft returns to normal.

*Code call equipment busy*

When the code call equipment is busy, this switch functions as set out under Station to Station Service—Dialed Line Busy.

CONFERENCE CALL SERVICE

A telephonic conference may be held by arranging to have the interested parties dial the conference number at a pre-arranged time or signal. Conference service is provided for on a certain bank contact of a certain level (usually the sixth). The "lines" of the conference number are multipled from bank to bank but the C contacts are not multipled. The C contacts of the conference number in a given bank is connected to the Conf. Priv. lead of the connector having access to that bank, making it possible for any number of connectors to switch through on the conference number.

*Seizure*

When this switch is seized, it performs the same functions as explained under Station to Station Service—Seizure.

*Connecting the wipers to the conference banks*

The first digit dialed will operate the switch vertically to the conference level and the second digit dialed will rotate the switch to the contact which has been preselected for conference purposes. During this operation, relays A, B and E are energized in the manner originally described.

*Extending the connection to the conference*

Relay E upon restoring (after the series of impulses to the rotary magnet has ceased), closes the circuit to the lower winding on relay L from ground through make contacts 135 on relay B, through the break contacts 224 on relay G, through the upper winding on relay L, through the break contacts 213 on relay E, through the break contacts 237 on relay L, through the contacts 256 or 257 on relay H, over the C wiper, over the Conf. Priv. lead and through the lower winding on relay L to —battery. Relay L operates and does the following in manner previously described; effects a lock circuit for itself; extends the dialing line through the switch to the conference banks; and closes the circuit to relay F over the conference line. An impedance (not shown) bridged across the conference line causes relay F to operate and open the break contacts 204 thus preventing the application of interrupted generator current on the conference line. The energizing circuit for relay F is as follows: —battery through the upper winding on relay F, through the break contacts 200, through the make contacts 230 on relay L, through the break contacts 100 on relay M, over the —L, through the contacts 250 or 251 on relay H, onto the "—" wiper over the line (not shown), through the impedance across the line, back over the lower line, over the "+" wiper, through the contacts 252 or 253 on relay H, through the break contacts 103 on relay M, through the make contacts 232 on relay L, through the break contacts 204 on relay F, through the CAM SPGS1, through resistor T, and through Int. Gen. to ground. Then relay D operates when current flows from —battery through the upper winding of the relay D, through the make contacts 201 of relay F, through the make contacts 230 of relay L, through the break contacts 100 of relay M, through contacts 250 or 251 of relay H, over the "—" wiper, over the —line, through the bridged impedance, over the +line, over the "+" wiper, through the contacts 252 or 253 on relay H, through the break contacts 103 on relay M, through the make contacts 232 on relay L, through make contacts 203 on relay F, through the lower winding on relay D, through the make contacts 202 on relay F, and through the make contacts 130 on relay B to ground.

Transmission battery is supplied to the dialing line through the relay A.

*Releasing*

When the handset at the dialing telephone is replaced, this switch releases in the manner described under Station to Station Service—Releasing.

OPERATION ON SPECIAL SERVICE LEVELS

This circuit is arranged for trunk hunting, switching through, with or without discriminating DISC service, on certain special service levels; and trunk hunting, non-switching through, with or without discriminating service, on other special service level or levels.

Restricted (also called "discriminating") service may be provided for in any of the following ways:

When "W" wiring is used, restricted service is provided only on non-switch through levels, i. e. on levels on which normal post springs NP 2 and 5 operate. For this type of service "W" has to be connected to "U," and the jack terminals 1 and 2 have to be strapped together at the point "X" as shown on the left side in Figure 1. Such a line is allowed service on all levels except the non-switch through level. Since the NP springs 1 open up on the non-switch through level, the ground existing on the C lead is removed thereby denying service to the restricted line on that level.

When "Z" wiring is used, restricted service is provided only on switch through levels, i. e. on levels on which normal post springs NP 3 and 4 operate. To obtain this type of service it is necessary that "Z" be connected to "U" and that the jack terminals 1 and 2 be strapped together at the point "X" as indicated on Figure 1. Such a line is restricted to service on all levels except on the non-switch through level. Since NP springs 2 close on the non-switch through level, ground on C lead is applied through NP springs 2 to the automatic rotary circuit thereby allowing unrestricted trunk hunting service on that level. At all other levels NP springs 2 are open. Whenever it is desired to dispense with restricted service for all lines and on all levels, strap together the jack terminals 2 and 3.

To provide completely unrestricted service to some lines, connect jack terminals 1 and 2. All lineswitches with leads EC (DISC) grounded (and connector jack terminals 1 and 2 strapped) are not restricted in any sense; that is, on any given level, the service of that level is available to them.

From the methods described above, it is evident that a variety of services may be obtained with a single connector switch and its associated two-hundred lines.

TRUNK HUNTING AND SWITCHING THROUGH SERVICE

NP springs 3 and 4 operate on dialed level.

*Seizure*

When this switch is seized, it operates in the fashion described under Station to Station Service—Seizure.

*Moving the wipers to the dialed level*

The first series of impulses will cause this switch to move its wipers to the dialed level in a well known manner. The normal post springs NP 3 and 4 are operated when the shaft reaches the dialed level. The NP springs 4 operate to close a circuit to the lower resistance winding on relay M in series with the upper winding on relay D. Then NP springs 3 prepare a circuit to the upper winding on relay M. Relay D operates over the following circuit: —battery through the upper winding on relay D, through the lower resistance winding on relay M, through the NP springs 4, through the break contacts 245 on relay K, through the break contacts 235 on relay L, and through the make contacts 135 on relay B to ground.

Operation of relay D results in the energization of relay G over the following path: —battery through the winding on relay G, through the break contacts 262 on the rotary magnet, through the break contacts 211 on relay E, through the make contacts 144 on relay C, and through the make contacts 153 on relay D to ground. Relay G closes its lock circuit when current begins to flow from —battery through the winding on relay G, through the break contacts 262 on the rotary magnet, through the make contacts 152 on relay D, through the make contacts 223 on relay G, and through the make contacts 135 on relay B to ground. As a result of above circuit, relay G will remain operated even though relay C restores and opens its make contacts 144 or if the relay E operates and opens its break contacts 211.

*Dialing line entitled to trunk hunting service*

When the dialing line is entitled to trunk hunting service, the dialing lineswitch has lead EC (DISC) grounded. Relay C, on restoring after the series of impulses to the vertical magnet, opens up at one point the operating circuit to relay G when make contacts 144 open up; and closes the circuit to relay E and the rotary magnet from ground on lead EC through the break contacts 143 on relay C, through the make contacts 151 on relay D, through the CAM SPG 3, through the make contacts 221 on relay G, through the winding on relay E, through the break contacts 234 on relay L, and through the winding on the rotary magnet to —battery. Relay E operates and connects relay G to the C wiper over the following circuit: —battery through the winding on relay G, through the break contacts 262 on the rotary magnet, through the make contacts 212 on relay E, through the break contacts 237 on relay L, and through the contacts 256 or 257 on relay H to the C wiper. The rotary magnet rotates the shaft, moving the wipers onto the first trunk of the dialed level. Relay G restores because the break contacts 262 on rotary magnet open up the lock circuit to relay G. Thereupon the circuit to relay E and the rotary magnet is opened up when the make contacts 221 on relay G open.

When the trunk is free, the circuit to relay G remains open, and relay E on restoring, causes this switch to seize the trunk as later explained below.

*Automatically hunting for a free trunk*

When the first trunk is busy, the rotary magnet on restoring, closes the circuit to relay G from ground on the C wiper in the manner described above. Relay G operates; closes its lock circuit to insure the complete operation of the rotary magnet if a free trunk is found; and closes the circuit to relay E and the rotary magnet. The rotary magnet rotates the shaft, moving the wipers to the next trunk and opens the circuit to relay G. The foregoing operations continue until a free trunk is found or the wipers are removed from the banks. Due to its slow release action, relay E remains operated during the automatic rotation of the shaft.

*Seizing the first free trunk encountered*

When a free trunk is found, absence of ground on the C wiper prevents further closing of the circuit to relay G. Relay E restores and permits current to flow from ground through make contacts 135 on relay B, through break contacts 224 on relay G, through the upper winding on relay L, through the break contacts 213 on relay E, through the break contacts 237 on relay L, through the contacts 256 or 257 on relay H, out on the C wiper to the battery connected "C" lead of the seized trunk circuit. Relay L operates and closes its lock circuit through its lower winding through the make contacts 238 and through the make contacts 135 on relay B to ground. Relay D is released when the following circuit, —battery through the upper winding on relay D, through the lower winding on relay M, through the NP springs 4, through the break contacts 245 on relay K, through the break contacts 235 on relay L, and through make contacts 135 on relay B to ground, is opened at break contacts 235 on relay L. Operation of relay L causes the following circuit to be made: —battery through the upper winding on relay M, through the NP springs 3, through the break contacts 244 on relay K, through the make contacts 238 on relay L, and through the make contacts 135 on relay B to ground. As a result of the make contacts 236 closing, the C wiper is connected directly to the lead C as follows: C wiper through the contacts 256 or 257 on relay H, and through the make contacts 236 on relay L to the C lead. Relay M operates causing the break contacts 106 to open thus opening a part of the incomplete release circuit so that this switch will not release when relay B restores; closes, at make contacts 108, a multiple circuit of the incomplete chain circuit; extends, at the make contacts 101 and 104, the dialing line directly through to the seized trunk; disconnects, at the break contacts 102 and 105, relay A from the dialing line —L and +L, to clear the dialing line of attachments; and removes, at the break contacts 107, ground from the Mot. ST lead. Relay A restores and opens the circuit to B. Due to the slow release action, relay B remains operated until the trunk circuit ahead returns ground over the C wiper to hold this switch and the preceding switches operated.

*Releasing*

When the handset at the dialing telephone is replaced, the trunk circuit removes ground from the C wiper, thereby making this switch free and opening the circuit to relays L and M. Relay L restores. Relay M restores; opens part of the incomplete chain circuit at contacts 108; and closes the circuit, to the release magnet as follows: ground through the break contacts 106 on relay M, through the break contacts 122 on relay A, through the break contacts 133 on relay B, through the V. O. N. springs 3, and through the winding on RLSE magnet to —battery. RLSE magnet is then energized. When the shaft returns to normal, the V. O. N. springs 3 restore and open the circuit to the RLSE magnet.

*Busy signal—switch encounters all trunks busy*

When all trunks on the dialed level are busy, the shaft on the eleventh rotary step operates the second section of the cam springs. CAM SPGS 3 open at this point the circuit to relay E and the rotary magnet. The latter restores and closes the circuit to relay G from ground on lead EC, through the break contacts 143 on relay C, through the make contacts 151 on relay D, through the CAM SPGS 4, through the break contacts 262 on the rotary magnet, and through the winding on relay G to —battery. Relay E, on restoring after the cessation of automatic rotation of the shaft, closes partly a lock circuit to relay G by means of the break contacts 211. The make contacts 220 place the Busy Tone on the calling line. Further operation is similar to that described in Station to Station Service—Dialed Line Busy.

*Dialing line not entitled to trunk hunting service*

When the dialing line is not entitled to trunk hunting service, the dialing party's lineswitch does not have lead EC (DISC) grounded. Relay C, upon restoring after termination of the series of impulses to the vertical magnet, opens the operating circuit to relay G when the make contacts 144 open up. Relay G however remains operated because of its lock circuit which has been established in the manner previously described. Make contacts 220 on relay G place busy tone on the dialing line.

TRUNK HUNTING AND NON-SWITCH THROUGH SERVICE

The NP springs 2 and 5 operate on dialed level.

*Seizure*

When this switch is seized, it performs the same functions as enumerated under Station to Station Service—Seizure.

*Moving the wipers to the dialed level*

The first series of pulses causes this switch to move its wipers to the dialed level as explained under Station to Station Service—Connecting the Wipers to the Dialing Line. The normal post springs NP 2 and 5 are operated when the shaft reaches the dialed level and make the following circuit: —battery through the upper winding on relay D, through the lower resistance winding on relay M, throuhg the NP springs 5, through the break contacts 245 on relay K, through the break contacts 235 on relay L, and through the make contacts 135 on relay B to ground; NP springs 2 prepare a circuit to relay E and rotary magnet. Relay D operates and completes an energizing circuit to relay G from —battery through the winding on relay G, through the break contacts 262 on the rotary magnet, through the break contacts 211 on relay E, through the make contacts 144 on relay C, and through the make contacts 153 on relay D to ground. Relay D further prepares the circuit to relay E and the rotary magnet by closing its make contacts 151; also prepares a multiple path for the energizing current passing through relay G when contacts 152 close so that subsequent opening of the break contacts 211 on relay E or the opening of the make contacts 144 on relay C will not restore relay G. Relay G operates and closes its lock circuit as formerly described.

From this point on, operation is similar to that described in Trunk Hunting and Switch Through Service—Dialing Line Entitied to Trunk Hunting Service and Automatically Hunting for a Free Trunk with the exception that relay M does not operate here because the lower resistance winding of relay M will not energize the relay. For ease in illustration the circuit established is as follows: ground on C lead through the connection of "U" and "Z" through the NP springs 2, through the break contacts 143 on relay C, through the make contacts 151 on relay D, through the CAM SPGS 3, through the make contacts 221 on relay G through the winding on relay E, through the break contacts 234 on relay L, and through the winding on the rotary magnet to —battery. Relay M does not operate because the circuit to its operating (upper) winding remains incomplete because of an open existing at the NP springs 3 which do not operate on this level. Consequently, the calling line is not switched through free of the condensers N and P and the other components shown in Figs. 1 and 2.

*Seizing the first free trunk encountered*

When a free trunk is encountered, absence of ground upon C wiper prevents the further closing of the circuit to relay G. Relay E, upon restoring, closes the circuit to the upper winding on relay L in series with the bridge cut-off relay in the seized lineswitch over the C1 wiper. Relay L operates; closes a lock circuit to its lower winding; replaces the indirect ground on the C1 wiper with direct ground (which makes the seized trunk busy); and opens a part of the incomplete impulsing circuit at the break contacts 234, so that relay E and the rotary magnet will not operate if the circuit to relay A is again interrupted. Make contacts 232 place interrupted generator current on the dialed line. Make contacts 231 place the ring-back tone current on the dialing line.

The operation of this equipment when the dialed party answers and later when the dialing party releases is similar to that explained under Station to Station Service —Dialed Party Answers and Releasing, respectively.

The normal post springs restore to normal when the switch shaft restores to normal.

I claim:

1. In a telephone system, a group of trunk lines, a plurality of groups of subscribers' lines and each subscriber group divided into a plurality of sub-groups, an automatic switch having access to said lines and having a plurality of sets of wipers one set for each subscriber group, impulse controlled means for operating said wiper sets in a primary movement in response to the receipt of impulses of a first digit, normal post springs operated in response to a predetermined primary setting of said switch wipers for a given first digit corresponding to said trunk group, automatic circuit selecting means controlled by said normal post springs, when said springs are operated in response to actuation of said switch upon the receipt of impulses of said first digit, for automatically operating said switch wiper sets in a secondary movement upon the termination of the receipt of the impulses of said first digit, to automatically select and connect with the first idle trunk line in said trunk group, automatic releasing means effective in case said switch is operated to a different predetermined primary setting in response to the receipt of impulses of a different first digit for automatically releasing said switch wipers to normal, wiper set selecting means operated in accordance with said different predetermined primary setting of said switch to select one of said wiper sets and the corresponding subscriber group, said impulse controlled means reoperated in response to the receipt of the impulses of a second digit corresponding to said given first digit for operating said wiper sets in a primary movement to select a particular sub-group of subscriber lines in the selected group by said selected wiper set and for operating said normal post springs, circuit preventative means operated in response to said automatic release of said switch to normal for rendering said automatic circuit selecting means controlled by said operated normal post springs inoperative, and means for thereafter directively operating said selected wiper set in a secondary movement in response to the receipt of impulses of a third digit to select and connect with a subscriber's line in the selected sub-group.

2. In a telephone system, a group of trunk lines, a first and a second group of subscriber lines, each of said groups divided into sub-groups, an automatic switch having a first wiper set having access to said trunk lines and said first group of subscriber lines, a second wiper set in said switch having access to said second group of subscriber lines, primary impulse controlled means in said switch operated in response to the receipt of impulses of a first digit for directively operating said wiper sets in an initial primary movement to a primary setting, automatic releasing means in said switch for automatically releasing said switch from its initial primary setting in case said initial primary setting of said switch corresponds to either one of said groups of subscriber lines, wiper set selecting means controlled by said releasing means and effective to select either wiper set in accordance with the initial primary setting of said switch, said switch wipers reoperated by said primary impulse controlled means in a second primary movement responsive to the receipt of the impulses of a second digit for causing the selected wiper set to select one of said subgroups of subscriber lines, secondary impulse controlled means in said switch operated in response to the receipt of impulses of a third digit for directively operating said switch wipers in a directive secondary movement to cause said selected wiper set to select a particular one of said subscriber lines in said selected sub-group, normal post springs in said switch operated in case said switch wipers are operated to a predetermined primary setting in its initial primary movement in response to the receipt of the impulses of a predetermined first digit, and automatic selecting circuit means in said switch controlled by the operation of said normal post springs on a first predetermined digit for automatically operating said switch in an automatic secondary movement upon the termination of the receipt of said impulses of said predetermined first digit to cause said first wiper set to select the first idle trunk line in said trunk group.

3. In a telephone system, a group of trunk lines having a single digit trunk call number, a group of private branch exchange subscriber lines having a single digit group call number and each of said private branch exchange subscriber lines having an individual three digit call number, a first and a second division of subscriber lines, each divided into groups and each subscriber line having an individual three digit call number, an automatic switch having a first wiper set having access to said group of trunk lines, to said group of private branch exchange subscriber lines and to said first division of subscriber lines, a second wiper set in said switch having access to said second division of subscriber lines, primary impulse controlled means in said switch for directively operating said switch wiper sets in an initial primary movement in response to the receipt of impulses of a first digit, automatic releasing means in said switch for automatically releasing said switch wipers from their initial primary setting in case said switch is initially operated in response to the receipt of impulses of a predetermined first digit corresponding to a first digit in any one of said three digit call numbers, wiper set selecting means controlled by said releasing means and effective to select the wiper set in accordance with said predetermined first digit, said switch wipers reoperated by said primary controlled means in a second primary movement in response to the receipt of impulses of a group identifying second digit in a three digit call number to cause the selected wiper set to select said group of private branch exchange subscriber lines or one of said groups of subscriber lines, secondary impulse controlled means in said switch for directively operating said switch wipers in a directive secondary movement in response to the receipt of impulses of a third digit in said individual three digit call number to cause said selected wiper set to connect with a particular one of said lines in said selected group corresponding to said three digit call number, normal post springs in said switch operated when said wipers are operated in a primary movement responsive to the receipt of impulses of a digit corresponding to either one of said single digit call numbers, automatic selecting circuit means in said switch controlled by said normal post springs, when said springs are operated by an initial primary movement in response to the receipt of impulses of said single digit call number, for automatically operating said switch in an automatic secondary movement upon the termination of the receipt of said single digit, and means whereby the first idle one of said private branch exchange lines is selected in said automatic secondary movement in case said single digit corresponds to said single digit group call number and whereby the first idle trunk line is selected by said automatic secondary movement in case said single digit corresponds to said single digit trunk call number.

4. In a telephone system, a group of private branch exchange subscriber lines having a single digit group call number and each of said lines having an individual three digit call number, an automatic switch having access to said lines, primary impulse controlled means in said switch operated in response to the receipt of impulses of the first digit of an individual call number for directively operating said switch in an initial primary movement to a predetermined primary setting, automatic switch releasing means in said switch for automatically releasing said switch from its predetermined primary setting, said switch reoperated by said primary means operated in response to the receipt of impulses of a group identifying second digit of said individual call number for directively operating said switch in a second primary movement to select said group, secondary impulse controlled means in said switch operated in response to the receipt of impulses of a line identifying third digit in said individual call number for directively operating said switch in a directive secondary movement to connect with the line individual to said three digit call number, normal post springs in said switch operated in case said switch is operated in response to the receipt of impulses of a single digit corresponding to said group identifying call number to select said group in its initial primary movement, and automatic selecting circuit means controlled by said normal post springs, when said normal post springs are operated in response to said initial primary movement of said switch on the receipt of said impulses of said single digit, for automatically operating said switch in an automatic secondary movement upon the termination of the receipt of said impulses of said single digit to select the first idle one of said private branch exchange subscriber lines.

5. In a telephone system as claimed in claim 4 wherein said automatic switch releasing means includes a vertical wiper and vertical bank contact corresponding to said predetermined primary setting for controlling said automatic release.

6. In a telephone system as claimed in claim 4 including a relay operated in response to the automatic release of said switch from its initial primary setting, and contacts on said relay for preventing the operation of said automatic selecting circuit means in case said normal post springs are operated in response to said secondary primary movement.

7. In a telephone system, a group of trunk lines, a group of subscriber lines divided into sub-groups, an automatic switch having access to said trunk lines and said subscriber lines, primary impulse controlled means in said switch operated in response to the receipt of digital impulses for directively operating said switch in an initial primary movement, automatic releasing means in said switch for automatically releasing said switch from its initial primary setting in case said switch is initially operated to select said group of subscriber lines, said switch reoperated by said primary controlled means in a second primary movement in response to the receipt of additional impulses to select a sub-group of said subscriber lines, secondary impulse controlled means in said switch operated in response to the receipt of further impulses for directively operating said switch in a directive secondary movement to connect with a particular subscriber's line in said selected sub-group, normal post springs in said switch operated in case said switch is operated to a predetermined primary setting in its initial or second primary movement, automatic selecting circuit means in said switch controlled by said normal post springs, when operated in response to said initial primary movement of said switch on the receipt of a first predetermined digit, for automatically operating said switch in an automatic secondary movement after the receipt of said predetermined first digit to select the first idle trunk in said trunk group, a switch-through relay in said switch, a circuit for operating said relay prepared in response to the operation of said normal post springs on said initial primary setting of said switch, means operative in response to said switch selecting said idle trunk line for completing said prepared circuit to operate said relay, and contacts operated by said relay for disconnecting all bridges from the talking conductors of said switch and for closing a direct metallic circuit over said talking conductors through said switch.

8. In a telephone system, a group of trunk lines, a group of subscriber lines divided into sub-groups, an automatic switch having access to said trunk lines and said subscriber lines, primary impulse controlled means in said switch operated in response to the receipt of digital impulses for directively operating said switch in an initial primary movement, automatic releasing means in said switch for automatically releasing said switch from its initial primary setting in case said switch is initially operated to select said group of subscriber lines, said swich reoperated by said primary controlled means in a second primary movement in response to receipt of additional impulses to select a sub-group of said subscriber lines, secondary impulse controlled means in said switch operated in response to the receipt of further impulses for directively operating said switch in a directive secondary movement to connect with a particular subscriber's line in said selected sub-group, normal post springs in said switch operated in case said switch is operated to a predetermined primary setting in its initial or second primary movement, automatic selecting circuit means in said switch controlled by said normal post springs, when operated in response to said initial primary movement of said switch on the receipt of a predetermined first digit, for automatically operating said switch in an automatic secondary movement after receipt of said predetermined first digit to select the first idle trunk in said trunk group, a switch-through relay in said switch, a circuit for operating said relay prepared in response to the operation of said normal post springs on said initial primary setting of said switch, means operative in response to said switch selecting said idle trunk line for completing said prepared circuit to operate said relay, and contacts operated by said relay for disconnecting all bridges from the talking conductors of said switch and for closing a direct metallic circuit over said talking conductors through said switch, and a second relay included in said automatic releasing means operated in response to said automatic release of said switch for opening said first mentioned relay circuit to prevent the operation of said first relay when a subscriber's line is being called.

9. In a telephone system, a group of trunk lines, a group of subscriber lines divided into sub-groups, an automatic switch having access to said trunk lines and said subscriber lines, primary impulse controlled means in said switch operated in response to the receipt of digital impulses for directively operating said switch in an initial primary movement, automatic releasing means in said switch for automatically releasing said switch from its initial primary setting in case said switch is initially operated to select said group of subscriber lines, said switch reoperated by said primary controlled means in a second primary movement in response to the receipt of additional digital impulses to select a sub-group of said subscriber lines, secondary impulse controlled means in said switch operated in response to the receipt of further digital impulses for directively operating said switch in a directive secondary movement to connect with a particular subscriber's line in said selected sub-group, normal post springs in said switch operated in case said switch is operated to a predetermined primary setting in its initial or second primary movement, automatic selecting circuit means in said switch controlled by said normal post springs, when operated in response to said initial primary movement of said switch on receipt of a predetermined first digit, for automatically operating said switch in an automatic secondary movement after the receipt of said predetermined first digit to select the first idle trunk in said trunk group, calling lines of two different classes for controlling the operation of said switch, and circuit restricting means operated by said normal post springs for preventing the operation of said automatic selecting circuit means only in case calling subscribers of the first of said classes operate said switch in an attempt to make a call to said group of trunk lines.

10. In a telephone system, a group of trunk lines, a group of subscriber lines divided into subgroups, an automatic switch having access to said trunk lines and said subscriber lines, primary impulse controlled means in said switch operated in response to the receipt of impulses for directively operating said switch in an initial primary movement, automatic releasing means in said switch for automatically releasing said switch from its initial primary setting in case said switch is initially operated to select said group of subscriber lines, said switch reoperated by said primary controlled means in a second primary movement in response to the receipt of additional impulses to select a sub-group of said subscriber lines, secondary impulse controlled means in said switch operated in response to the receipt of digital impulses for directively operating said switch in a directive secondary movement to connect with a particular subscriber's line in said selected sub-group, normal post springs in said switch operated in case said switch is operated to a predetermined primary setting in its initial or second primary movement, automatic selecting circuit means in said switch controlled by said normal post springs, when operated in response to said initial primary movement of said switch on the receipt of a predetermined first digit, for automatically operating said switch in an automatic secondary movement after the receipt of said predetermined first digit to select the first idle trunk in said trunk group, calling lines of two different classes for controlling the operation of said switch, circuit restricting means operated by said normal post springs for preventing the operation of said automatic selecting circuit means only in case calling subscribers of the first of said classes operate said switch in an attempt to make a call to said group of trunk lines, and means associated with only the second class of calling subscriber lines for enabling the operation of said automatic selecting circuit means irrespective of the operation of said circuit restricting means by said normal post springs in response to a calling subscriber in the second class making a call to said group of trunk lines.

11. In a telephone system, a group of trunk lines and groups of subscribers' lines, an automatic switch having primary movement in one direction for selecting said group of trunk lines or one of said groups of subscribers' lines and a secondary movement for selecting a trunk line of said group of trunk lines or for selecting a subscriber's line in one of said subscribers' groups, impulse controlled means for operating said switch in its primary movement in response to the receipt of a first digit, normal post springs operated in response to a predetermined primary setting of said switch for a given first digit corresponding to said group of trunk lines, circuit means controlled by said operated normal post springs for automatically operating said switch in its secondary movement upon the termination of the receipt of the impulses of said given first digit, to automatically select and connect with the first idle trunk line in said trunk group, automatic releasing means effective in case said switch is operated to a different predetermined primary setting in response to the receipt of impulses of a different first digit for automatically releasing said switch to its normal position, preventative means controlled by the automatic release of said switch to normal for rendering said circuit means controlled by said normal post springs ineffective in case said switch is operated in a succeeding primary movement to said predetermined primary setting in response to impulses of a second digit corresponding in value to said given first digit, and means for thereafter directively operating said switch in its secondary movement in response to the receipt of impulses of a third digit to connect with a subscriber's line in one of said subscriber groups.

12. In a telephone system, a group of trunk lines, a first and second group of subscriber lines, each of said groups of subscriber lines divided into subgroups, an automatic switch having a first wiper set having access to said trunk lines and said first group of subscriber lines, and a second wiper set having access to said second group of subscriber lines, primary impulse controlled means in said switch operated in response to digit impulses for directively operating said wiper sets in an initial primary movement to different primary settings, normal post springs in said switch operated when said wipers are operated to a predetermined primary setting corresponding to said trunk group, automatic selecting means controlled by said operation of said normal post springs when said springs are operated in said initial primary movement of said wipers and responsive to said wipers reaching said predetermined primary setting for automatically operating said first wiper in a secondary movement to select the first idle trunk line in said trunk group, automatic releasing means operated in accordance with the operation of said wipers to a different predetermined primary setting corresponding to a desired subscriber group in said initial primary movement for automatically releasing said switch from its primary setting, wiper set selecting means controlled by said releasing means for selecting the wiper set associated with said desired subscriber group, said wipers reoperated in a second primary movement by said primary impulse controlled means to select a desired subgroup in said desired group of subscriber lines, means operated responsive to operation of said releasing means for preventing said automatic selecting means from operating in case said wipers are operated to the same setting as said first predetermined primary setting in said second primary movement, and secondary impulse controlled means in said switch operated in response to subsequently received digit impulses for directively operating said switch in a directive secondary movement to cause said selected wiper set to select the desired subscriber line in said desired group of subscriber lines.

13. In a telephone system, a plurality of groups of lines each divided into subgroups, an automatic switch having a plurality of wiper sets, each of said sets having access to a different one of said plurality of groups of lines, means for moving said wiper sets in an initial and second primary movement and in a secondary movement, an extra wiper and a set of contacts accessible thereto, there being a contact for each group of lines, said extra wiper moved vertically over its contacts only during said initial and second primary movements of said wiper sets, means operated when said extra wiper engages a particular one of its contacts corresponding to one of said groups of lines on an initial primary movement for releasing said wiper sets and for controlling the selection of the one of said wiper sets corresponding to said one group of lines to thereby select said one group of lines, said moving means operating said wiper sets in said second primary movement to cause said selected one wiper set to directively select a desired subgroup in said selected group and in a secondary movement to directively select a desired line in said selected subgroup, normal post springs in said switch operated when said wiper sets are operated to a predetermined position corresponding to a particular one of said subgroups in said one group of lines in said initial primary movement, and means controlled by said normal post springs whenever said springs are operated by said initial primary movement to said predetermined position for causing an automatic secondary movement of said wiper sets and said one wiper set to select the first idle line in said particular one subgroup.

14. In a telephone system as claimed in claim 13, means responsive to the operation of said releasing means for preventing the automatic secondary movement of said wiper sets in case said normal post springs are operated on said second primary movement.

15. In a telephone system as claimed in claim 14, said preventing means also preventing the reoperation of said releasing means in case said extra wiper engages said particular one of its contacts on said second primary movement.

16. In a telephone system, a group of trunk lines, a group of subscriber lines divided into subgroups, an automatic switch having access to said trunk lines and said subscriber lines, primary impulse controlled means for directively operating said switch in an initial primary movement to a primary setting, normal post springs in said switch operated in case said switch is operated to a predetermined primary setting on said initial primary movement in response to impulses of a first predetermined digit corresponding to said group of trunk lines, automatic selecting means, a control relay in said switch for preparing said automatic selecting means for operation, a circuit for operating said relay, said circuit completed and said relay being operated only if said normal post springs are operated on said initial primary movement, said automatic selecting means thereupon operated in case said relay is operated responsive to the termination of the receipt of said impulses of said first predetermined digit for automatically operating said switch in a secondary movement to select the first idle trunk line in said trunk group, automatic circuit releasing means in said switch operated in case said switch is operated to a different predetermined primary setting on said initial primary movement in response to impulses of a different predetermined digit corresponding to said group of subscriber lines to automatically release said switch from said different primary setting, a second relay operated responsive to the release of said switch, said switch reoperated in a second primary movement responsive to impulses of a second digit corresponding in value to said first predetermined digit to select a subgroup in said group of subscriber lines, said operated second relay effective to open said first mentioned relay circuit to prevent the operation of said automatic selection means when a subscriber line is being called, and means operated responsive to the receipt of impulses of a third digit corresponding to a subscriber line for directively operating said switch in a secondary movement to select said subscriber line.

17. In a telephone system, an automatic switch having groups of lines divided into sub-groups and wipers accessible thereto, means for moving said wipers in an initial primary movement to select a subgroup of lines and in a secondary movement over the lines of a group to select an idle line in said sub-group, a pair of normal post springs in the switch operated when the said wipers are moved to a certain position corresponding to a particular subgroup of lines, an extra wiper and a set of contacts accessible thereto, said extra wiper moved over its contacts only during the said initial or second primary movement of the said wipers, means for causing an automatic secondary movement of said wipers whenever the said normal post springs are operated on said initial primary movement of the said wipers, means operated whenever the said extra wiper engages a particular one of its contacts on said initial primary movement of said wipers for releasing said wipers and for preventing said automatic secondary movement of said switch upon subsequent operations of said normal post springs following the release of said switch.

18. In a telephone system as claimed in claim 17, means responsive to the operation of said releasing means for preventing the release of said wipers in case said extra wiper is operated to said particular one of its contacts on the said second primary movement of said wipers.

19. In a telephone system, a group of private branch exchange subscriber lines having a single digit group call number and each of said private branch exchange subscriber lines having an individual three digit call number, a first and a second division of subscriber lines each divided into groups of subscriber lines, and each of said subscriber lines having an individual three digit call number, an automatic switch having a first wiper set having access to said group of private branch exchange subscriber lines and to said first division of subscriber lines, a second wiper set in said switch having access to said second division of subscriber lines, primary impulse controlled means in said switch for directively operating said switch wiper sets in an initial primary movement in response to the receipt of impulses of a first digit, automatic releasing means in said switch for automatically releasing said switch wipers from their initial primary setting in case said switch is initially operated in response to the receipt of impulses of a predetermined first digit corresponding to the first digit in any one of said three digit call numbers, wiper set selecting means controlled by said releasing means and effective to select the wiper set in accordance with said predetermined first digit, said switch wipers reoperated by said primary controlled means in a second primary movement in response to receipt of impulses of a group identifying second digit in a three digit call number to cause the selected wiper set to select said group of private branch exchange subscriber lines or one of said groups of subscriber lines, secondary impulse controlled means in said switch for directively operating said switch wipers in a directive secondary movement in response to the receipt of impulses of a third digit in said individual three digit call number to cause said selected wiper set to connect with a particular one of said lines in said selected group corresponding to said three digit call number, normal post springs in said switch operated when said wipers are operated in a primary movement responsive to the receipt of impulses of a digit corresponding to said single digit call number, automatic selecting means in said switch controlled by said normal post springs only when said springs are operated by an initial primary movement in response to the receipt of impulses of said single digit call number for automatically operating said switch in an automatic secondary movement upon the termination of the receipt of impulses of said single digit to thereby select the first idle one of said private branch exchange lines.

References Cited in the file of this patent

UNITED STATES PATENTS

| | | |
|---|---|---|
| 1,626,103 | Simmons | Apr. 26, 1927 |
| 1,813,138 | Beale | July 7, 1931 |
| 1,883,680 | Friendly | Oct. 18, 1932 |
| 1,891,423 | Kahn | Dec. 20, 1932 |
| 2,419,282 | Ostline | Apr. 22, 1947 |
| 2,506,730 | Morris | May 9, 1950 |
| 2,522,720 | Jones | Sept. 19, 1950 |
| 2,642,498 | Riddell et al. | June 16, 1953 |
| 2,658,949 | Pharis | Nov. 10, 1953 |
| 2,691,066 | Fisher | Oct. 5, 1954 |
| 2,721,902 | Pharis | Oct. 25, 1955 |
| 2,744,962 | Bakker | May 8, 1956 |